Oct. 16, 1962
T. J. GRABOWSKI
3,058,162
METHOD OF MAKING VERY LOW DENSITY
CELLULAR POLYSTYRENE PRODUCTS
Filed April 11, 1960
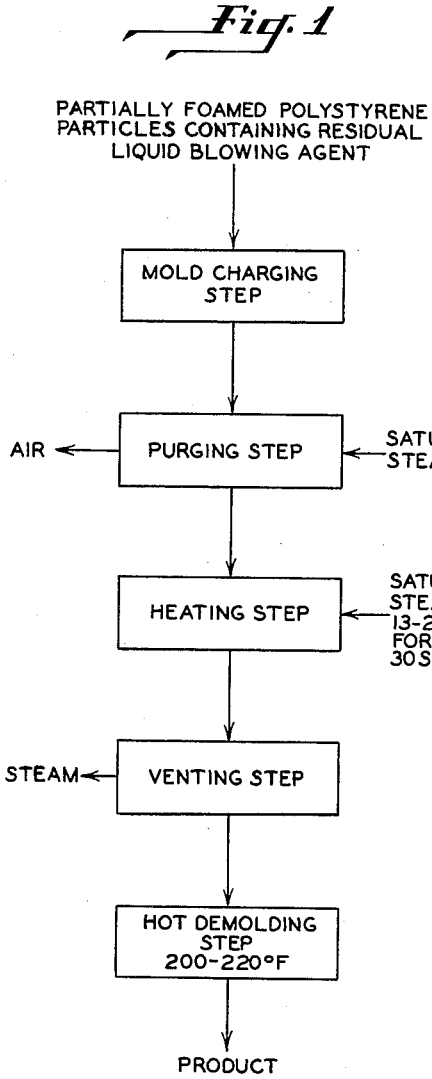
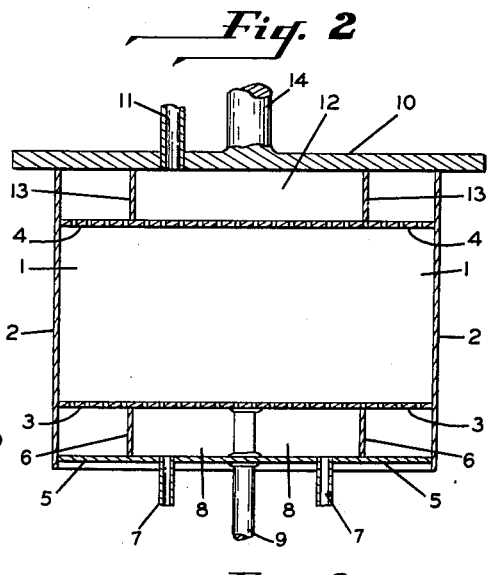
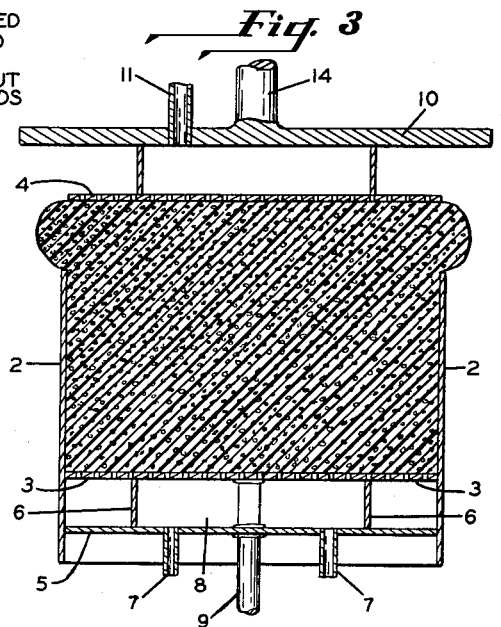
INVENTOR
THADDEUS J. GRABOWSKI
ATTORNEY

3,058,162
METHOD OF MAKING VERY LOW DENSITY CELLULAR POLYSTYRENE PRODUCTS

Thaddeus J. Grabowski, Salisbury Township, Lancaster County, Pa., assignor to Armstrong Cork Company, Lancaster, Pa., a corporation of Pennsylvania
Filed Apr. 11, 1960, Ser. No. 21,322
4 Claims. (Cl. 18—48)

This invention relates generally to cellular products and more particularly to an improved process for forming cellular products from small particles of partially foamed synthetic thermoplastic resins. Still more particularly the invention relates to an improved process of forming very low density cellular polystyrene products.

U.S. Patents 2,744,291, issued May 1956, and 2,787,809, issued April 9, 1957, disclose processes for the formation of cellular products wherein small particles of thermoplastic resins having a liquid blowing agent distributed therethrough are subjected to heat in a perforated mold in order to form a cellular product which conforms to the shape of the mold. These and other teachings relating to the formation of cellular thermoplastic resinous products frequently mention that low density products having a density of less than one pound per cubic foot may be prepared by those processes. As a practical matter, all existing processes appear unable to turn out such low density products consistently.

Accordingly, it is the primary object of the present invention to present a process wherein very low density cellular polystyrene products may be consistently prepared. It is a further object of the present invention to disclose a process whereby cellular polystyrene articles having a density in the range of about 0.4–0.8 pound per cubic foot may be consistently produced with a minimum of waste.

These objects are accomplished in a straightforward manner. The invention contemplates charging a perforated mold with partially but incompletely expanded polystyrene particles containing residual amounts of an organic volatile non-reactive liquid expanding agent boiling in the range of 10°–80° C. in which polystyrene is insoluble. Sufficient of the partially expanded polystyrene particles is added to the mold to form a fully expanded product having a density in the required range of 0.4–0.8 pounds per cubic foot. Steam is passed through the closed mold and, after purging, is allowed to build to a steam pressure in the range of 13–20 pounds per square inch gauge. This pressure will cause the particles to coalesce, expand, and fill the mold. Steam is then turned off, and the mold is vented. The expanded product is then removed from the mold while the product is still at a temperature in the range of 200°–220° F. in order to allow the demolded product to continue to expand outside of the mold. The fully expanded product is then allowed to cool.

The liquid expanding agents are those liquids which have a boiling point lower than the softening point of the polystyrene used. Additionally, the liquid expanding agents are generally insoluble in polystyrene. The liquid expanding agents may be distributed throughout the polystyrene particles by soaking the particles in the liquid expanding agent for a suitable period of time either at room temperature or above. Pressure may be used if desired. Generally speaking these procedures will incorporate between 3% and 15% by weight of the liquid expanding agent into the polystyrene particles. An alternate means of incorporating the liquid expanding agent into the polystyrene particles is to conduct the polymerization of the monomeric styrene in the presence of the liquid expanding agent. Examples of the liquid expanding agent are methyl alcohol, methyl chloride, dichloroethane, and low boiling chlorofluoroalkanes. A preferred class of the liquid expanding agents is the aliphatic or cycloaliphatic hydrocarbons having a boiling point in the range of about 10°–80° C. As examples there may be mentioned pentane, hexane, heptane, cyclopentane, cyclohexane, cyclopentadiene, petroleum ether, and mixtures of these liquids.

The polystyrene particles containing the liquid expanding agent will generally have a diameter of from about 0.5–5 millimeters, and it is these particles which are to be partially foamed or expanded. The pre-expansion of the particles is preferably accomplished by means of steam in any convenient manner. Steam is preferred in order that sufficient residual liquid expanding agent will remain in the particles to allow subsequent complete expansion. The partial expansion is carried out so that the resulting partially expanded particles will have a bulk density in the range of about 1–4 pounds per cubic foot. By bulk density is meant the apparent density in pounds per cubic foot of a mass of the partially expanded particles which are not firmly adhered together to form a single unitary mass.

The partially foamed beads are placed in a mold having a perforated top plate and a perforated bottom plate. An amount of partially expanded particles is used so that the final expanded product will have a density in the required very low density range of 0.4–0.8 pound per cubic foot. Hence for every cubic foot in the interior of the mold, 0.4–0.8 pound of the partially expanded beads should be used. This amount of beads will generally fill the mold approximately half full. The cover is then placed on the mold, and steam is passed into the mold, preferably through the bottom and out the top.

Steam is passed through the mold in order to purge air from the mold. Once the air is purged, the steam outlet of the mold should be closed in order to build the steam pressure in the interior of the mold to supply the necessary heat to cause the further expansion of the partially expanded polystyrene particles to fill the interior of the mold. The mold is used as an autoclave. It has been found that the steam pressure in the interior of the mold must be in the range of about 13–20 pounds per square inch gauge, and preferably 15–17 pounds per square inch gauge, in order to form the very low density material. Steam pressures less than the above-stated minimum bring about temperatures too low to sufficiently expand the polystyrene particles and to cause particle-to-particle fusion. Steam pressures higher than the above-stated maximum cause temperatures so high that undesired softening and flowing of the polystyrene occurs with attendant foam collapse.

The requisite steam pressure of 13–20 pounds per square inch gauge need be maintained only for a period of time sufficient for the entire mass to expand and fill the interior of the mold completely. For a mold having an interior capacity in the range of about 15–25 cubic feet, about 30 seconds of steam pressure in the stated range will suffice. The steam is then cut off and the interior of the mold is vented to reduce the steam pressure to atmospheric pressure. There then follows the step which lies at the heart of the present process.

Normally, the fully expanded product would be allowed to cool in the mold either by blowing air or water therethrough or by simply allowing the mold and product to reach ambient conditions. In the present process however the fully expanded product must be demolded while that product is still hot and capable of further expansion. It has been found that the temperature of the fully expanded block within the mold must be in the range of about 200°–220° F. when the product is demolded. As a practical matter the block will almost always be at a temperature of about 212° F. when it is removed from the mold. This follows from the fact that saturated steam has been used to bring about expansion, and the pressure of the mold and product is atmospheric pressure during demolding.

The demolding step should be carried out with reasonable rapidity since the product begins to expand further as soon as it is released from the confining walls of the mold. It is preferred that the cover of the mold be removed and the product be lifted or otherwise rapidly removed from the confines of the mold in a manner which will not deform the product due to handling. The result of the hot demolding step is that the product continues to expand as it is demolded, achieving a final size generally about 20% larger than its size when filling in the closed mold. The product is then allowed to cool, preferably under ambient conditions. During cooling it will be found that some shrinkage of the product will occur, but this shrinkage does not destroy the unusually low density of the product. Edges and sides may be trimmed off if desired in order to form a shaped product.

The final product will be found to possess a density in the range of 0.4–0.8 pound per cubic foot, an unusually and unexpectedly low density for this type of product. Within the density range stated, minor variations will occur depending on the precise amount of partially expanded particles placed in the mold in the beginning of the process. The preferred density will be 0.5 pound per cubic foot.

In the accompanying drawings:

FIG. 1 illustrates a simplified flow diagram of the process of the present invention;

FIG. 2 illustrates, in vertical sectional view, a simplified mold shown in cross-section in which the process of the present invention may be carried out; and FIG. 3 illustrates a simplified cross-sectional view of the hot demolding step in which the product being demolded has begun to expand beyond the size of the interior of the mold.

FIG. 1 is a self-explanatory. In FIG. 2 the mold cavity 1 is bounded by the mold walls 2 and the bottom perforated plate 3 and the top perforated plate 4. The bottom sealing plate 5 supports the bottom perforated plate 3 by means of the supports 6. Steam inlets 7 in the bottom sealing plate 5 open into the manifold 8 from which the steam passes through the bottom perforated plate 3 into the mold cavity 1. The bottom sealing plate 5 and the bottom perforated plate 3 fit inside the mold walls 2 and are both connected to the ram 9 which is suitably powered to move the plates 3 and 5 in an upwardly direction to discharge the product from the mold during the hot demolding step. The top sealing plate 10 carries one or more steam outlets 11. Steam outlets 11 open into the upper manifold 12 which lies between the upper sealing plate 10 and the upper perforated plate 4; supports 13 connect the plates 10 and 4. The top sealing plate 10 carries a ram 14 by means of which the plates 10 and 4 may be raised for the filling of the mold with the partially foamed particles and for discharge of the final product. The mold cavity which is charged with the proper amount of partially expanded polystyrene particles, and the upper sealing plate 10 and the upper perforated plate 4, are placed in position to close the mold. Steam is passed into steam inlets 7 to purge the mold and, on closing the steam outlets 11, to achieve the requisite pressure of 13–20 pounds per square inch gauge at the manifold 8. The mold is thus used as an autoclave. Alternatively, steam may be passed through the steam outlets 11, which, under such circumstances, serve as a steam inlet; this will occur when the steam is passed in a downwardly direction through the mold. The steam inlets 7 will then actually become steam outlets. After the steam has been on to purge the mold and to achieve the requisite pressure for a sufficient period of time to cause complete expansion of the particles in the mold, the steam is cut off and the inlets 7 and outlets 11 are open to the atmosphere in order to reduce the steam pressure to atmospheric pressure. When the product reaches the requisite temperature of 200°–220° F., the upper sealing plate 10 and the upper perforated plate 4 are removed; the period of time of waiting for the product in the mold to reach the requisite temperature is usually short, only about 30 seconds being required for a foamed block of 15–25 cubic feet. As the upper perforated plate 4 is raised, the top portion of the fully expanded products within the mold will tend to expand further and follow the upper perforated plate 4 as it is raised. Once the upper perforated plate 4 and the plate 10 have been sufficiently removed from the top of the mold, power is supplied to the ram 9 in order to lift the lower perforated plate 3 and discharge the product from the mold. As the product rises above the mold cavity walls 2, the product will expand in a sideways direction. FIG. 3 shows the type of expansion that takes place as the product is being demolded. The demolding step is carried out rapidly, 5 or 10 seconds being required for a foamed block of 15–25 cubic feet.

The block is then put aside to cool, and this cooling may take 24–48 hours to be complete. Some shrinkage will occur, but this shrinkage merely causes surface irregularities on the product and is easily eliminated by trimming or cutting the final product. The final product will be found to have the very low density of 0.4–0.8 pound per cubic foot, yet it will be uniform, of fine cellular texture, strong, substantially non-friable and sturdy. The product is particularly useful as a packaging material, but it may also be used as an insulation material against heat and cold, as a shock absorber in vehicles, and for the making of toys and decorations.

I claim:

1. The method of making very low density articles of cellular polystyrene which comprises charging a perforated mold with sufficient partially but incompletely expanded polystyrene particles containing residual amounts of an organic liquid expanding agent boiling within the range of about 10°–80° C. to form a fully expanded product having a density in the range of 0.4–0.8 pound per cubic foot, passing saturated steam into said mold to purge the mold of air and to achieve a steam pressure in the range of 13–20 pounds per square inch gauge to cause said particles to expand and fill the mold, venting the steam pressure in the mold, removing the expanded product from the mold at a temperature in the range of 200°–220° F. to allow the demolded product to continue to expand outside of the mold to achieve a density in the range of 0.4–0.8 pound per cubic foot and cooling the resulting product.

2. The method according to claim 1 wherein said liquid expanding agent comprises petroleum ether.

3. The method according to claim 1 wherein said demolding temperature is about 212° F.

4. The method according to claim 1 wherein said steam pressure in the mold is about 15–17 pounds per square inch gauge.

References Cited in the file of this patent

UNITED STATES PATENTS

| | | |
|---|---|---|
| 2,283,316 | Cooper et al. | May 19, 1942 |
| 2,531,665 | Booth | Nov. 28, 1950 |
| 2,787,809 | Stastney | Apr. 9, 1957 |

OTHER REFERENCES

Koppers Technical Manual, Bulletin C–9–273, "Mold Techniques and Mold Design," chapter 3e, Nov. 15, 1959, pp. 18–22.

Koppers Booklet, "Dylite-Expandable-Polystyrene," 1954, pp. 24–26.